(12) United States Patent
Pasupuleti et al.

(10) Patent No.: US 11,941,154 B2
(45) Date of Patent: *Mar. 26, 2024

(54) SECURING PERSONALLY IDENTIFIABLE AND PRIVATE INFORMATION IN CONVERSATIONAL AI-BASED COMMUNICATION

(71) Applicant: VENTECH SOLUTIONS, INC., Columbus, OH (US)

(72) Inventors: Ravi Kiran Pasupuleti, Triplicane Chennai (IN); Ravi Kunduru, Columbus, OH (US)

(73) Assignee: Ventech Solutions, Inc., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,766

(22) Filed: Mar. 27, 2023

(65) Prior Publication Data

US 2023/0229808 A1    Jul. 20, 2023

Related U.S. Application Data

(63) Continuation of application No. 16/820,967, filed on Mar. 17, 2020, now Pat. No. 11,651,107.

(51) Int. Cl.
*G06F 21/62* (2013.01)
*G06N 3/04* (2023.01)
(Continued)

(52) U.S. Cl.
CPC .......... *G06F 21/6254* (2013.01); *G06N 3/04* (2013.01); *G06N 3/08* (2013.01); *G10L 13/00* (2013.01);
(Continued)

(58) Field of Classification Search
None
See application file for complete search history.

(56) References Cited

U.S. PATENT DOCUMENTS 8,806,647 B1    8/2014  Daswani
10,009,666 B1 *  6/2018  van Scheltinga . H04W 36/0094
(Continued)

*Primary Examiner* — Pierre Louis Desir
*Assistant Examiner* — Nicole A K Schmieder
(74) *Attorney, Agent, or Firm* — Mahamedi IP Law LLP

(57) ABSTRACT

Method and system of securing personally identifiable and sensitive information in conversational AI based communication. The method comprises enabling a first service provider device as a communication channel provider of an incoming communication mode and enabling a second service provider device s a communication channel provider of an outgoing communication mode, at least one of the incoming communication and outgoing communication modes comprising an audio communication, storing content of a conversation in the incoming communication mode in a first storage medium accessible to the first service provider device but not the second service provider device, and storing content of the conversation in the outgoing communication mode at a second storage medium accessible to the second service provider device but not the first service provider device, and anonymizing the audio communication wherein personally identifiable audio characteristics of the user are obfuscated from the service provider devices.

20 Claims, 4 Drawing Sheets

(51) Int. Cl.
*G06N 3/08* (2023.01)
*G10L 13/00* (2006.01)
*G10L 15/16* (2006.01)
*G10L 15/18* (2013.01)
*G10L 15/22* (2006.01)
*G10L 15/30* (2013.01)

(52) U.S. Cl.
CPC .............. *G10L 15/16* (2013.01); *G10L 15/18* (2013.01); *G10L 15/22* (2013.01); *G10L 15/30* (2013.01); *G10L 2015/223* (2013.01)

(56) References Cited

U.S. PATENT DOCUMENTS

| | | | |
|---|---|---|---|
| 11,043,219 B1* | 6/2021 | Walters | ................. G10L 21/013 |
| 2008/0079989 A1 | 4/2008 | Agnetta | |
| 2009/0210419 A1 | 8/2009 | Chignis | |
| 2010/0201378 A1 | 8/2010 | Costanzo | |
| 2011/0018657 A1 | 1/2011 | Cheng | |
| 2012/0319821 A1 | 12/2012 | Karttaavi | |
| 2013/0227695 A1 | 8/2013 | Mohanakrishnan | |
| 2013/0232472 A1 | 9/2013 | Korner | |
| 2013/0290322 A1 | 10/2013 | Prosnitz | |
| 2015/0248536 A1 | 9/2015 | Tawil | |
| 2018/0144465 A1 | 5/2018 | Hsieh | |
| 2018/0199996 A1 | 7/2018 | Hogan | |
| 2019/0104982 A1 | 4/2019 | Dunn | |
| 2019/0180174 A1 | 6/2019 | Koswatta | |
| 2020/0113488 A1 | 4/2020 | Al-Ali | |
| 2020/0250387 A1 | 8/2020 | Hiraoka | |
| 2021/0043205 A1* | 2/2021 | Lee | ......................... G10L 15/22 |
| 2021/0192762 A1 | 6/2021 | Guan | |
| 2021/0225378 A1* | 7/2021 | Montemurro | ........... G10L 15/22 |
| 2022/0139070 A1 | 5/2022 | Okamoto | |

* cited by examiner

300

Enabling, in response to the identifying a conversation session initiated with a client device, a first service provider device in a set of service providers as communication channel provider of the incoming mode and enabling a second service provider device of the set as communication channel provider of the outgoing mode, wherein the first provider device facilitates conversations with the client device in the communication channel of the first mode but not of the second mode, and the second provider device facilitates conversations with the client device in the communication channel of the second mode but not of the first mode  310

Storing at least a portion of content of the incoming conversation in a first storage medium accessible to the first provider but not the second provider, and storing at least a portion of content from the outgoing conversation at a second storage medium accessible to the second provider device but not the first provider device

Enabling, in response to the identifying a conversation session initiated with a client device, a first service provider device in a set of service providers as communication channel provider of the incoming mode and enabling a second service provider device of the set as communication channel provider of the outgoing mode, wherein the first provider device facilitates conversations with the client device in the communication channel of the first mode but not of the second mode, and the second provider device facilitates conversations with the client device in the communication channel of the second mode but not of the first mode
310

Storing at least a portion of content of the incoming conversation in a first storage medium accessible to the first provider but not the second provider, and storing at least a portion of content from the outgoing conversation at a second storage medium accessible to the second provider device but not the first provider device
320

300

Anonymizing the audio communication from the client device by applying a set of speaker-specific transforms to audio characteristics inherent to a user at the client device, wherein personally identifiable audio characteristics of the user are obfuscated from the first and second service provider devices
410

FIG. 4

SECURING PERSONALLY IDENTIFIABLE AND PRIVATE INFORMATION IN CONVERSATIONAL AI-BASED COMMUNICATION

RELATED APPLICATION

This application is a Continuation of U.S. patent application Ser. No. 16/820,967 filed Mar. 17, 2020, the aforementioned priority application being hereby incorporated by reference in its entirety.

TECHNICAL FIELD

The disclosure herein relates to securing content of conversational communications as enabled by automated speech recognition services and clients.

BACKGROUND

The issue of avoiding third-party disclosure of confidential client or customer information remains a significant concern. When a digital assistant is used, everything that is being said gets sent over the communication network or internet to the digital assistant host company, typically a third-party services provider, for processing, where the user's speech is often analyzed and stored in order that the host company can improve its digital assistant. The concern of third-party disclosure is well-established for various types of voice-to-text speech recognition services when a transcription feature processes voice into text, and vice versa, on remote servers.

BRIEF DESCRIPTION OF THE DRAWINGS

FIG. 3 illustrates, in one example embodiment, a method of securing personally identifiable and sensitive information in conversational AI based communication.

FIG. 4 illustrates, in another example embodiment, a method of securing personally identifiable and sensitive information in conversational AI based communication.

DETAILED DESCRIPTION

Figure 1:
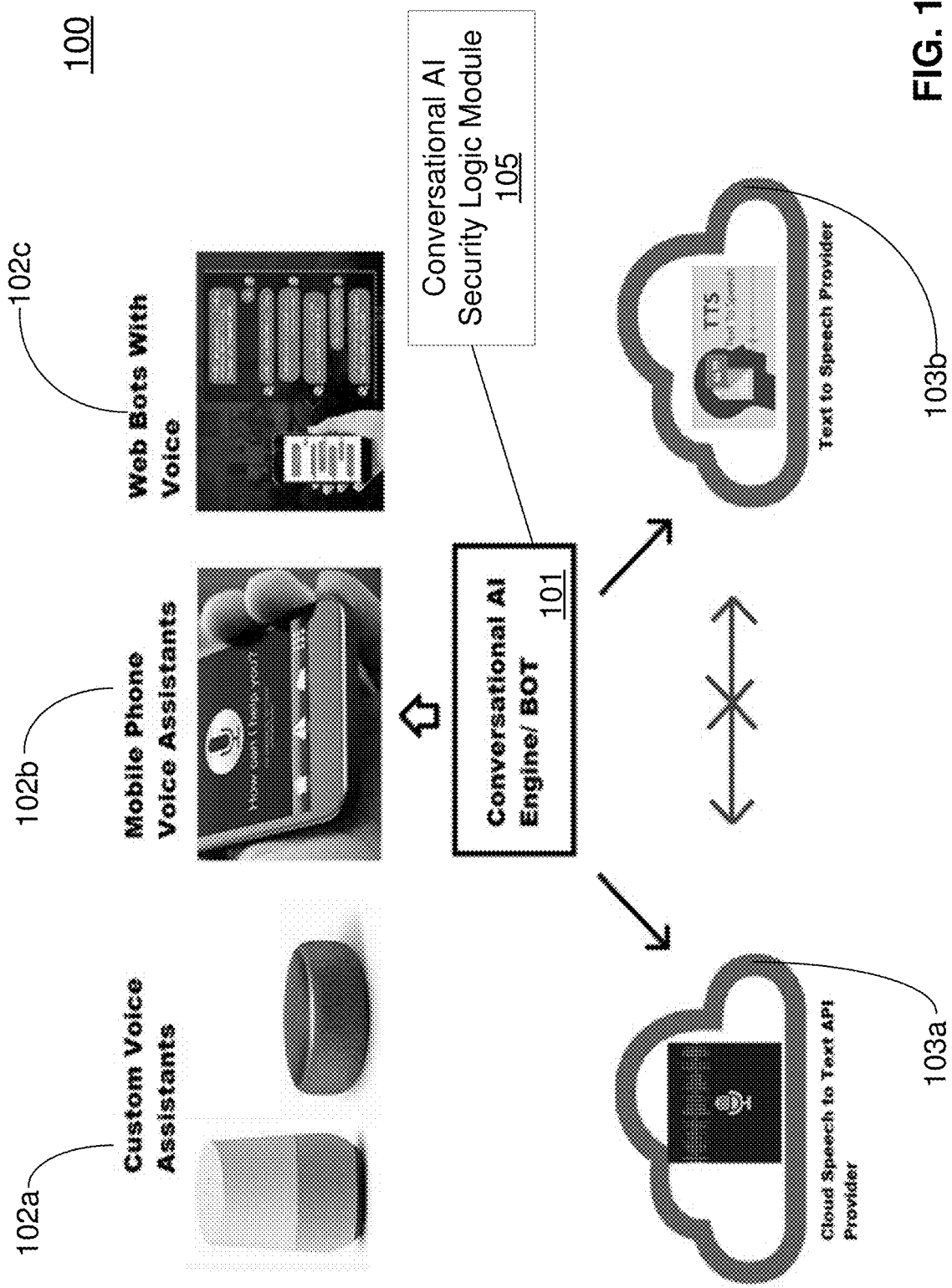
FIG. 1 illustrates, in an example embodiment, a system implementing a conversational AI server computing device in securing personally identifiable and sensitive information in conversational AI based communication.

Methods and systems provided herein, among other advantages and benefits, secure both data content and data content originator information from third party automated speech recognition services used for incoming and outgoing communications between a customer or client user and a business entity. In this context, the third-party service providers are tasked with providing intermediary services, including automated speech recognition services that implement speech-to-text (STT) and text-to-speech (TTS) technologies, such as natural language processing, voice bots and other voice-based artificial intelligence (AI) interfaces, to enable and conduct duplex communications between a client user and a business entity in privy with that client user. Current approaches to preserving privacy and integrity of client user data during such communications or conversations are generally directed to identifying sensitive content portions forming part of the duplex communication, and by fragmenting, extracting and segregating, also encrypting and obfuscating same, in an effort to avoid private and sensitive data from being exposed to third party public providers of automated speech recognition services.

Embodiments herein recognize that a given third-party service provider, notwithstanding efforts as described to preserve a user's private information, can commonly apply AI and neural network context based applications to derive an increasingly more complete agglomeration of a given customer's personally identifiable, and supposedly private, data from disparate conversation content portions that might have been separately and cumulatively acquired over the course of several successive conversation exchanges. When both STT and TTS are performed by the same third party service provider, the data logged by the service provider can be used to extract information that can reveal the context and other sensitive data based on the context of the conversation. The STT and TTS providers log the data that is communicated via their services infrastructure, which can be used to train their AI-based models and extract valuable and sometimes even personally identifiable private information.

In this manner, third party automated speech recognition providers, in addition to providing intermediary TTS and STT services, typically in streaming mode, between a client user in privy with a business entity, can accumulate considerable scope of supposedly private data in conjunction with customer identity data, even when in compliance with an applicable privacy policy, to the point where the user's data privacy becomes compromised.

Embodiments provided herein, among other benefits, allow a business entity to enable a given automated speech recognition provider to facilitate either one, but not both of an incoming or outgoing communication session in its entirety, between a user or client and the business entity, without identifying and extracting sensitive data content portions to protect client identity and private data. In particular, provided, in a first example embodiment, is a method of securing personally identifiable and sensitive information in conversational AI based communication. The method comprises enabling, in response to the identifying a conversation session initiated with a client device, a first service provider device in a set of service providers as communication channel provider of the incoming mode and enabling a second service provider device of the set as communication channel provider of the outgoing mode, wherein the first provider device facilitates conversations with the client device in the communication channel of the first mode but not of the second mode, and the second provider device facilitates conversations with the client device in the communication channel of the second mode but not of the first mode; and storing at least a portion of content of the incoming conversation in a first storage medium accessible to the first provider but not the second provider, and storing at least a portion of content from the outgoing conversation at a second storage medium accessible to the second provider device but not the first provider device.

In an embodiment, one of the incoming and outgoing conversations comprises a question communicated between one of the first and second provider devices and the client device, and the other of the incoming and outgoing conversations comprises a response in counterpart to the question, the response being communicated between the client device and the other of the first and second provider devices.

In some aspects, the incoming conversation communication mode comprises one of a text-to-speech (TTS) and a speech-to-text (STT) communication modes, and the outgoing conversation communication mode comprises the other of the TTS and STT communication modes.

In another embodiment, for an entirety of the conversation session, the first service provider device performs one of the incoming and outgoing communications and the second service provider device performs the other of the incoming and outgoing communications.

In yet another variation, at least one of the incoming and outgoing communication modes comprises at least one of an audio communication, a text message, an email and an instant messaging service.

In one embodiment, the at least one of the incoming and outgoing communication modes comprises audio communication from the client device, and the method further comprises anonymizing the audio communication of the client device.

In one aspect, anonymizing the audio communication from the client device by applying a set of speaker-specific transforms to audio characteristics inherent to a user at the client device, wherein personally identifiable audio characteristics of the user are obfuscated from the first and second service provider devices.

In an embodiment, the client device comprises at least one of a custom voice assistant, a mobile phone voice assistant and a web bot that incorporates voice capability.

In another aspect, the conversational AI server computing device incorporates at least one of automatic speech recognition, natural language processing, and advanced dialog management in conjunction with a neural network machine learning algorithm.

In accordance with a second example embodiment, a non-transitory medium storing instructions executable in a processor of a server computing device is provided. The instructions, when executed in one or more processors, cause operations comprising enabling, in response to the identifying a conversation session initiated with a client device, a first service provider device in a set of service providers as communication channel provider of the incoming mode and enabling a second service provider device of the set as communication channel provider of the outgoing mode, wherein the first provider device facilitates conversations with the client device in the communication channel of the first mode but not of the second mode, and the second provider device facilitates conversations with the client device in the communication channel of the second mode but not of the first mode; and storing at least a portion of content of the incoming conversation in a first storage medium accessible to the first provider but not the second provider, and storing at least a portion of content from the outgoing conversation at a second storage medium accessible to the second provider device but not the first provider device.

In accordance with a third example embodiment, a conversational AI server computing system of securing personally identifiable and sensitive information in conversational AI based communication. The system comprises one or more processors and a memory. The memory stores instructions executable in the one or more processors causing operations comprising enabling, in response to the identifying a conversation session initiated with a client device, a first service provider device in a set of service providers as communication channel provider of the incoming mode and enabling a second service provider device of the set as communication channel provider of the outgoing mode, wherein the first provider device facilitates conversations with the client device in the communication channel of the first mode but not of the second mode, and the second provider device facilitates conversations with the client device in the communication channel of the second mode but not of the first mode; and storing at least a portion of content of the incoming conversation in a first storage medium accessible to the first provider but not the second provider, and storing at least a portion of content from the outgoing conversation at a second storage medium accessible to the second provider device but not the first provider device.

Conversational AI as referred to herein uses the set of technologies behind automated messaging and speech-enabled applications, such as automatic speech recognition (ASR), natural language processing (NLP) and advanced dialog management in conjunction with ML to understand, react and learn from every client interaction, offering human-like interactions between computers and humans. The conversational AI facilitates human-like conversational exchanges by recognizing speech and text, understanding intent, deciphering different languages, and responding in a way that mimics human conversation. As referred to in embodiments herein, conversational AI is implemented an artificial intelligence (AI) based neural network having interconnected nodes, and assemblies of nodes, representing layers of the neural network, including machine learning (ML) or deep learning (DL) models. In a particular embodiment, the ML or neural network model herein can be implemented as a convolution neural network (CNN).

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device.

Furthermore, one or more embodiments described herein can be implemented through the use of logic instructions that are executable by one or more processors of a computing device, including a server computing device. These instructions can be carried on a computer-readable medium. In particular, machines shown with embodiments herein include processor(s) and various forms of memory for storing data and instructions. Examples of computer-readable mediums and computer storage mediums include portable memory storage units, and flash memory. A server computing device as described herein utilizes processors, memory, and logic instructions stored on a computer-readable medium. Embodiments described herein can be implemented in the form of computer processor-executable logic instructions or programs stored on computer memory mediums.

System Description

FIG. 1 illustrates, in an example embodiment, system 100 of implementing a conversational AI server computing device 101 in securing personally identifiable and sensitive information in conversational AI based communication. Conversational AI server computing device 101 is in communication, in one embodiment via a cloud-based communication network, with client devices 102a, 102b, 102c (collectively referred to herein as client device 102) and third-party service provider devices 103a, 103b (collectively referred to herein as third-party service provider device 103). In embodiments depicted in FIG. 1, examples of client device 102 can include custom voice assistants 102a, mobile phone voice assistants 102b and web bots 102c incorporating voice or audio capability; examples of third-party service provider devices can include STT and TTS devices 103a, 103b that incorporate and provide application program interface (API) functionality.

In example embodiments, and without limitation, techniques and components of conversational AI server computing device 101 in conjunction with other components and aspects of system 100 as provided herein are manifested in text-to-speech (TTS) and speech-to-text (STT) conversion, voice recognition, voice bots, and other voice-based applications in medical and financial services and other privacy-sensitive fields.

Figure 2:
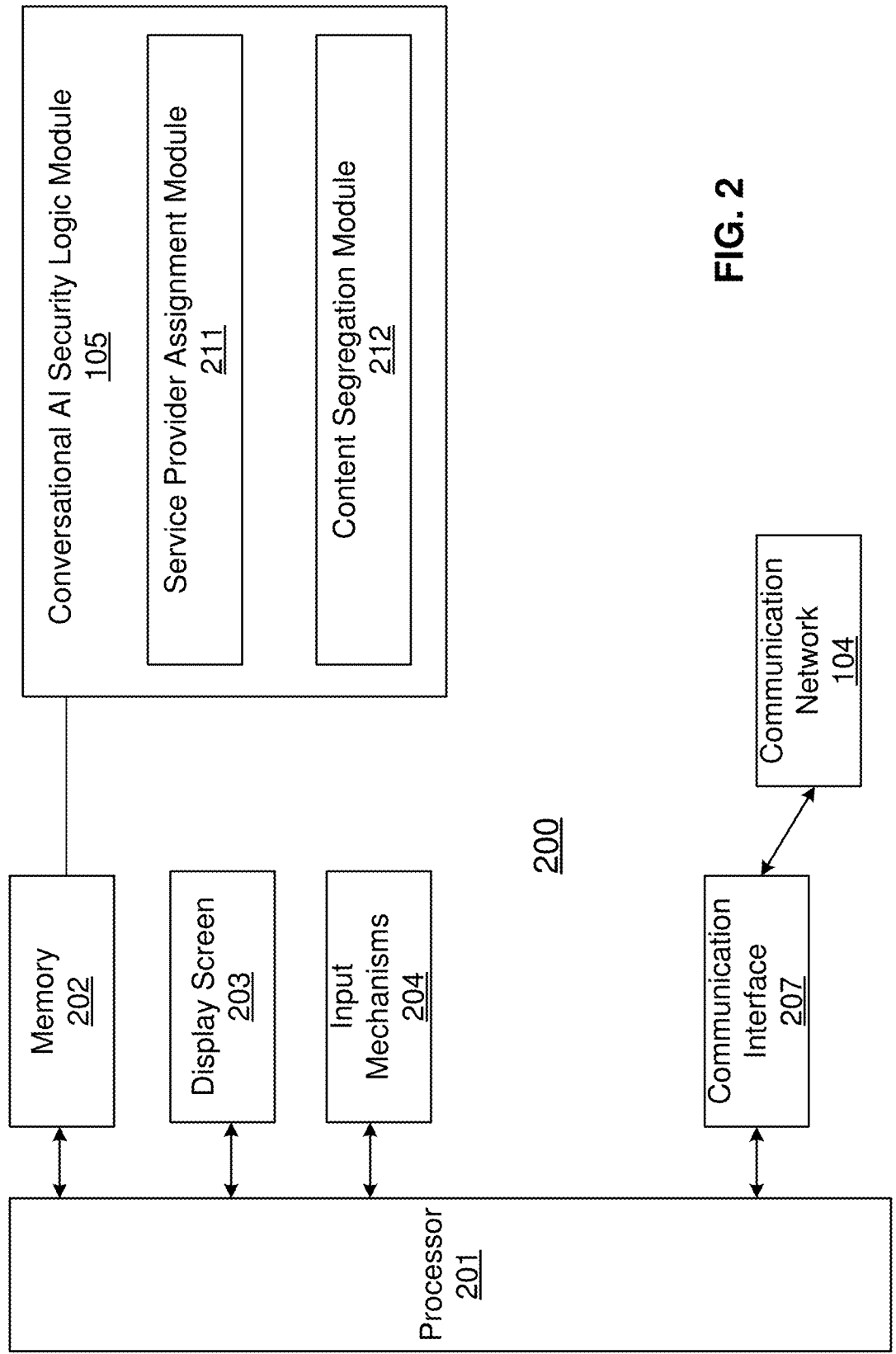
FIG. 2 illustrates, in one example embodiment, an architecture of a conversational AI server computing device in securing personally identifiable and sensitive information in conversational AI based communication.

FIG. 2 illustrates, in one example embodiment, an architecture 200 of a conversational AI server computing device in securing personally identifiable and sensitive information in conversational AI based communication. Server computing system or device 101, also referred to herein as server 101, can include processor 201, memory 202, display screen 203, input mechanisms 204 such as a keyboard or software-implemented touchscreen input functionality, and communication interface 207 for communicating via communication network 104. Memory 202 can comprise any type of non-transitory system memory, storing instructions that are executable in processor 201, including such as a static random access memory (SRAM), dynamic random access memory (DRAM), synchronous DRAM (SDRAM), read-only memory (ROM), or a combination thereof.

Conversational AI security logic module 105 includes processor-executable instructions stored in memory 202 of server 101, the instructions being executable in processor 201. Conversational AI security logic module 105 can comprise portions corresponding to sub-modules including service provider assignment module 211 and content segregation module 212.

Processor 201 uses executable instructions of service provider assignment module 211 to enable, in response to the identifying a conversation session initiated with a client device, a first service provider device in a set of service providers as communication channel provider of the incoming mode and enabling a second service provider device of the set as communication channel provider of the outgoing mode. Accordingly, the first provider device facilitates conversations with the client device in the communication channel of the first mode but not of the second mode, and the second provider device facilitates conversations with the client device in the communication channel of the second mode but not of the first mode.

Processor 201 uses executable instructions stored in content segregation module 212 to store at least a portion of content of the incoming conversation in a first storage medium accessible to the first provider but not the second provider, and storing at least a portion of content from the outgoing conversation at a second storage medium accessible to the second provider device but not the first provider device.

Methodology

FIG. 3 illustrates, in one example embodiment, a method of securing personally identifiable and sensitive information in conversational AI based communication, method 300 being performed by one or more processors 201 of server computing device 101. In describing and performing the embodiments of FIG. 3, the examples of FIG. 1 and FIG. 2 are incorporated for purposes of illustrating suitable components or elements for performing a step or sub-step being described.

Examples of method steps described herein relate to the use of server 101 for implementing the techniques described. According to one embodiment, the techniques are performed by conversational AI security logic module 105 of server 101 in response to the processor 201 executing one or more sequences of software logic instructions that constitute conversational AI security logic module 105.

At step 310, processor 201 executes instructions of service provider assignment module 211 to enable, in response to the identifying a conversation session initiated with a client device, a first service provider device in a set of service providers as communication channel provider of the incoming mode and enabling a second service provider device of the set as communication channel provider of the outgoing mode. Accordingly, the first provider device facilitates conversations with the client device in the communication channel of the first mode but not of the second mode, and the second provider device facilitates conversations with the client device in the communication channel of the second mode but not of the first mode.

At step 320, processor 201 of server computing device 101 executes instructions of content segregation module 212 to store at least a portion of content of the incoming conversation in a first storage medium accessible to the first provider but not the second provider, and storing at least a portion of content from the outgoing conversation at a second storage medium accessible to the second provider device but not the first provider device.

In an embodiment, one of the incoming and outgoing conversations comprises a question communicated between one of the first and second provider devices and the client device, and the other of the incoming and outgoing conversations comprises a response in counterpart to the question, the response being communicated between the client device and the other of the first and second provider devices.

In some aspects, the incoming conversation communication mode comprises one of a text-to-speech (TTS) and a speech-to-text (STT) communication modes, and the outgoing conversation communication mode comprises the other of the TTS and STT communication modes.

In another embodiment, for an entirety of the conversation session, the first service provider device performs one of the incoming and outgoing communications and the second service provider device performs the other of the incoming and outgoing communications. As referred to herein, the entirety of the conversation session lasts for a duration starting from when the communication is initiated until either the client device or the AI conversational served terminates the communication.

In yet another variation, at least one of the incoming and outgoing communication modes comprises at least one of an audio communication, a text message, an email and an instant messaging service. In embodiments herein, an incoming communication refers to a party that receives a communication attempt from another party that initiates that communication attempt. Thus, either client device or conversational server device, in the context used herein, may be the target of an incoming call that is initiated by the other party. Analogously, either client device or conversational server device, in the context used herein, may initiate an outgoing call to the other party.

In one embodiment, the at least one of the incoming and outgoing communication modes comprises audio communication from the client device, and the method further comprises anonymizing the audio communication of the client device.

In one aspect, anonymizing the audio communication from the client device by applying a set of speaker-specific transforms to audio characteristics inherent to a user at the client device, wherein personally identifiable audio characteristics of the user are obfuscated from the first and second service provider devices.

In an embodiment, the client device comprises at least one of a custom voice assistant, a mobile phone voice assistant and a web bot that incorporates voice capability.

In another aspect, the conversational AI server computing device incorporates at least one of automatic speech recognition, natural language processing, and advanced dialog management in conjunction with a neural network machine learning algorithm.

As referred to herein, conversational AI implements technologies of automated messaging and speech-enabled applications, such as automatic speech recognition (ASR), natural language processing (NLP) and advanced dialog management in conjunction with ML to understand, react and learn from every client interaction, offering human-like interactions between computers and humans. The conversational AI facilitates human-like conversational exchanges by recognizing speech and text, understanding intent, deciphering different languages, and responding in a way that mimics human conversation. As referred to in embodiments herein, conversational AI is implemented an artificial intelligence (AI) based neural network having interconnected nodes, and assemblies of nodes, representing layers of the neural network, including machine learning (ML) or deep learning (DL) models.

FIG. 4 illustrates, in another example embodiment, a method of securing personally identifiable and sensitive information in conversational AI based communication. In some aspects, such securing proceeds in conjunction with aspects as disclosed in FIGS. 1-3.

At step 410, anonymizing the audio communication from the client device 102. In an embodiment, the audio can be anonymized by applying either one or both of speaker-specific transform functions and waveform filters to audio provided by a user at the client device, wherein personally identifiable audio characteristics inherent to the user, such as frequency and pitch of the user's voice, or other vocal aspects that can be associated with an individual's unique voice signature, are obfuscated from the service provider devices. In yet other aspects, the voice based anonymization functionality can be applied to ensure anonymity in conjunction with sending partial data content of conversation exchanges between client devices to the different service provider devices along the same communication path.

It is contemplated that embodiments described herein extend to individual elements and concepts described herein, as well as for embodiments to include combinations of elements, features and techniques recited herein. Although embodiments are described in detail herein with reference to the accompanying drawings, it is to be understood that the invention is not limited to only such example embodiments. Accordingly, many modifications and variations will be apparent to practitioners skilled in the art. As such, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, absence of particular describing combinations does not preclude the inventors from claiming rights to such combinations.

What is claimed is:

1. A computer-implemented method, executed in one or more processors of a server computing device, comprising:

enabling a first service provider device in a set of service providers as a communication channel provider of an incoming communication mode and enabling a second service provider device of the set as a communication channel provider of an outgoing communication mode, wherein the first service provider device is enabled to facilitate conversations with a client device in the incoming communication mode but is not enabled to facilitate conversations of the outgoing communication mode, and the second service provider device is enabled to facilitate conversations with the client device in the outgoing communication mode but is not enabled to facilitate conversations of the incoming communication mode, at least one of the incoming communication and outgoing communication modes comprising an audio communication;

storing at least a portion of content of a conversation in the incoming communication mode in a first storage medium accessible to the first service provider device but not the second service provider device, and storing at least a portion of content of the conversation in the outgoing communication mode at a second storage medium accessible to the second service provider device but not the first service provider device; and anonymizing the audio communication by applying a speaker-specific transform function to audio characteristics associated with a user at the client device in conjunction with sending data content of the audio communication to the set of service provider devices, wherein personally identifiable audio characteristics inherent to the user are obfuscated from the first and second service provider devices.

2. The method of claim 1 wherein one of the incoming and outgoing communication modes comprises a question communicated between one of the first and second provider devices and the client device, and the other of the incoming and outgoing conversations comprises a response in counterpart to the question, the response being communicated between the client device and the other of the first and second provider devices.

3. The method of claim 2 wherein the incoming communication mode comprises one of a text-to-speech (US) and a speech-to-text (STT) communication modes, and the outgoing communication mode comprises the other of the US and STT communication modes.

4. The method of claim 3 wherein the first service provider device facilitates the incoming communication mode and the second service provider device facilitates the outgoing communication mode for an entirety of a conversation session initiated with the client device.

5. The method of claim 3 wherein the at least one of the incoming and outgoing communication modes further comprises at least one of a text message, an email and an instant messaging service.

6. The method of claim 1 wherein the server computing device is communicatively coupled, via a cloud-based communication network, with the client device and the set of service provider devices.

7. The method of claim 1 further comprising anonymizing the audio communication from the client device in accordance with applying a waveform filter to the audio characteristics associated with the user at the client device.

8. The method of claim 1 wherein the client device comprises at least one of a custom voice assistant, a mobile phone voice assistant and a web bot that incorporates voice capability.

9. The method of claim 1 wherein the server computing device incorporates at least one of automatic speech recognition, natural language processing, and advanced dialog management.

10. The method of claim 9 wherein the server computing device comprises a conversational artificial intelligence (AI) server computing device that incorporates the at least one of automatic speech recognition, natural language processing, and advanced dialog management in conjunction with a neural network machine learning algorithm.

11. A computing system comprising:
one or more processors;
a memory storing a set of instructions, the instructions when executed in the one or more processors causing operations comprising:
enabling a first service provider device in a set of service providers as a communication channel provider of an incoming communication mode and enabling a second service provider device of the set as a communication channel provider of an outgoing communication mode, wherein the first service provider device is enabled to facilitate conversations with a client device in the incoming communication mode but is not enabled to facilitate conversations of the outgoing communication mode, and the second service provider device is enabled to facilitate conversations with the client device in the outgoing communication mode but is not enabled to facilitate conversations of the incoming communication mode, at least one of the incoming communication and outgoing communication modes comprising an audio communication;
storing at least a portion of content of a conversation in the incoming communication mode in a first storage medium accessible to the first service provider device but not the second service provider device, and storing at least a portion of content of the conversation in the outgoing communication mode at a second storage medium accessible to the second service provider device but not the first service provider device; and
anonymizing the audio communication by applying a speaker-specific transform function to audio characteristics associated with a user at the client device in conjunction with sending data content of the audio communication to the set of service provider devices, wherein personally identifiable audio characteristics inherent to the user are obfuscated from the first and second service provider devices.

12. The computing system of claim 11 wherein one of the incoming and outgoing communication modes comprises a question communicated between one of the first and second provider devices and the client device, and the other of the incoming and outgoing conversations comprises a response in counterpart to the question, the response being communicated between the client device and the other of the first and second provider devices.

13. The computing system of claim 12 wherein the incoming communication mode comprises one of a text-to-speech (TTS) and a speech-to-text (STT) communication modes, and the outgoing communication mode comprises the other of the TTS and STT communication modes.

14. The computing system of claim 13 wherein the first service provider device facilitates the incoming communication mode and the second service provider device facilitates the outgoing communication mode for an entirety of a conversation session initiated with the client device.

15. The computing system of claim 13 wherein the at least one of the incoming and outgoing communication modes further comprises at least one of a text message, an email and an instant messaging service.

16. The computing system of claim 11 wherein the computing system is communicatively coupled, via a cloud-based communication network, with the client device and the set of service provider devices.

17. The computing system of claim 11 further comprising instructions executable in the one or more processors to implement operations comprising anonymizing the audio communication from the client device in accordance with applying a waveform filter to the audio characteristics associated with the user at the client device.

18. The computing system of claim 11 wherein the client device comprises at least one of a custom voice assistant, a mobile phone voice assistant and a web bot that incorporates voice capability.

19. The computing system of claim 11 wherein the computing system incorporates at least one of automatic speech recognition, natural language processing, and advanced dialog management.

20. A non-transitory medium storing instructions executable in one or more processors of a server computing device, the instructions when executed in the one or more processors causing operations comprising:
enabling a first service provider device in a set of service providers as a communication channel provider of an incoming communication mode and enabling a second service provider device of the set as a communication channel provider of an outgoing communication mode, wherein the first service provider device is enabled to facilitate conversations with a client device in the incoming communication mode but is not enabled to facilitate conversations of the outgoing communication mode, and the second service provider device is enabled to facilitate conversations with the client device in the outgoing communication mode but is not enabled to facilitate conversations of the incoming communication mode, at least one of the incoming communication and outgoing communication modes comprising an audio communication;
storing at least a portion of content of a conversation in the incoming communication mode in a first storage medium accessible to the first service provider device but not the second service provider device, and storing at least a portion of content of the conversation in the outgoing communication mode at a second storage medium accessible to the second service provider device but not the first service provider device; and
anonymizing the audio communication by applying a speaker-specific transform function to audio characteristics associated with a user at the client device in conjunction with sending data content of the audio communication to the set of service provider devices, wherein personally identifiable audio characteristics inherent to the user are obfuscated from the first and second service provider devices.

* * * * *